(12) United States Patent
Kuromizu

(10) Patent No.: US 8,310,627 B2
(45) Date of Patent: Nov. 13, 2012

(54) DISPLAY DEVICE AND TELEVISION RECEIVER APPARATUS

(75) Inventor: Yasumori Kuromizu, Osaka (JP)

(73) Assignee: Sharp Kabushiki Kaisha, Kyoto (JP)

( * ) Notice: Subject to any disclaimer, the term of this patent is extended or adjusted under 35 U.S.C. 154(b) by 309 days.

(21) Appl. No.: 12/867,778

(22) PCT Filed: Feb. 2, 2009

(86) PCT No.: PCT/JP2009/051726
§ 371 (c)(1),
(2), (4) Date: Aug. 16, 2010

(87) PCT Pub. No.: WO2009/107459
PCT Pub. Date: Sep. 3, 2009

(65) Prior Publication Data
US 2010/0309106 A1  Dec. 9, 2010

(30) Foreign Application Priority Data
Feb. 27, 2008 (JP) .................. 2008-046690

(51) Int. Cl.
*G02F 1/1335* (2006.01)

(52) U.S. Cl. .......................................... 349/96; 349/112
(58) Field of Classification Search ................... 349/96, 349/112
See application file for complete search history.

(56) References Cited

FOREIGN PATENT DOCUMENTS
JP  2007-256385 A  10/2007
WO  2007/037038 A1  4/2007

OTHER PUBLICATIONS

Official Communication issued in International Patent Application No. PCT/JP2009/051726, mailed on Apr. 14, 2009.

*Primary Examiner* — Phu Vu
(74) *Attorney, Agent, or Firm* — Keating & Bennett, LLP

(57) ABSTRACT

In a display device 10 according to the present invention, a display panel 11 and an optical sheet 15 are adjacent to each other without any other members therebetween. A chassis 14 housing a light source 17 has a sheet supporting portion 21b for supporting the optical sheet 15 at an outer-edge part thereof. A panel supporting member 250 for supporting the display panel 11 is arranged on the sheet supporting portion 21b. The optical sheet 15 has a cutout 151 and a tab 152 at an outer-edge part thereof. The tab 152 is supported by the sheet supporting portion 21b. The panel supporting member 250 is inserted in the cutout 151 and supports the display panel 11.

11 Claims, 16 Drawing Sheets

DISPLAY DEVICE AND TELEVISION RECEIVER APPARATUS

TECHNICAL FIELD

The present invention relates to a display device and a television receiver apparatus.

BACKGROUND ART

A liquid crystal panel used in a liquid crystal display device such as a liquid crystal television is not self-luminous. Therefore, a separate backlight unit is required as an illumination device. Such a backlight unit is usually installed behind of a liquid crystal panel (on a side opposite from a display screen). A known backlight unit includes a large number of linear light sources and an optical sheet such as a diffusing plate arranged on a light-outputting side of the linear light sources (see Patent Document 1).

Patent Document 1: Japanese Patent Laid-Open No. 2007-256385

Problems to be Solved by the Invention

Patent Document 1 discloses a configuration in which, in order to avoid deflection or wrinkling from occurring on an optical sheet, holes are respectively formed on four corners of a laminated optical sheet and holding members are inserted with a predetermined clearance through the holes. Accordingly, it is intended that expansion/contraction of the respective optical sheets due to temperature changes will be kept within an allowance even if ratios of expansion/contraction differ among the respective optical sheets.

However, to begin with, the technique disclosed in Patent Document 1 is aimed at suppressing the occurrence of a deflection or wrinkling of the optical sheets attributable to fixing the respective optical sheets with fixing brackets. In order to resolve this issue, a clearance is provided between the holding members and the holes. In other words, the technique disclosed in Patent Document 1 involves a frame provided between a liquid crystal panel and the optical sheet with a clearance provided therebetween. Since the technique is premised on the fact that the optical sheets can freely thermally-expand, an object of the technique is to hold such an optical sheet capable of free thermal expansion while allowing expansion/contraction.

If another member is not provided between a liquid crystal panel and an optical sheet to reduce the thickness of an apparatus, the optical sheet is subjected to a pressing force caused by the weight of the liquid crystal panel and the optical sheet cannot freely thermally expand. Even if the holding members and the holes disclosed in Patent Document 1 are provided, bending or wrinkling of the optical sheet cannot be suppressed. Since the optical sheet cannot freely expand or contract due to the pressing force applied by the liquid crystal panel, a central part of the sheet bends or wrinkles when the optical sheet expands due to heat generated by a light source.

DISCLOSURE OF THE INVENTION

The present invention has been made in consideration of the problems described above, and an object thereof is to provide a display device having a small thickness, and a wide display area and configurations in which an optical sheet provided between a light source and a display panel is less likely to bend or wrinkles. Another object of the present invention is to provide a television receiver apparatus including such a display device.

Means for Solving the Problems

In order to solve the problems described above, a display device according to the present invention includes a light source, a chassis that houses the light source, a display panel for providing display using light from the light source, and an optical sheet arranged between the light source and the display panel. The display panel and the optical sheet are adjacent to each other with no other members therebetween. The chassis has a sheet supporting portion for supporting the optical sheet at an outer-edge part and a panel supporting member for supporting the display panel is arranged on the sheet supporting portion. The optical sheet has an outer-edge part having a cutout formed by cutting out a part of the outer edge part such that the outer edge part steps inward in plan view and a tab projecting farther to an outside than an edge of the cutout. The tab is supported by the sheet supporting portion. The panel supporting member passes through the cutout and supports the display panel.

According to the above configuration in which a display panel and an optical sheet are arranged adjacent to each other without any other members therebetween, the thickness of the display device can be reduced. When the display panel and the optical sheet are arranged adjacent to each other the optical sheet cannot freely expand or contract due to the weight of the display panel. According to the present invention, the outer edge portion of the optical sheet has the cutout and the tab, and the tap is supported by the sheet supporting portion. Moreover, the panel supporting member that is arranged on the sheet supporting portion passes through the cutout of the optical sheet and supports the display panel. Therefore, a pressing force resulting from the weight of the display panel is less likely to applied to the optical sheet even in a thin display device in which another member is not provided between the display panel and the optical sheet. As a result, the optical sheet can freely expand or contract in the thin display device. Even when a thermal expansion occurs due to heat generated by the light source, the optical sheet can freely expand or contract and thus the center part of the optical sheet is less likely to bent or wrinkle.

If the optical sheet does not have a cutout or a tab and the display panel is supported by a panel supporting member arranged more outside where the optical sheet is arranged, a space in which the sheet is placed is required in addition to a space in which the projecting member is arranged. Namely, a frame area that is a non-display area increases and an effective display area may decrease. According to the configuration of the present invention, such spaces do not need to be separately provided in parallel and thus a wide display area can be provided.

BEST MODE FOR CARRYING OUT THE INVENTION

First Embodiment

A first embodiment of the present invention will be described with reference to the drawings.

Figure 1:
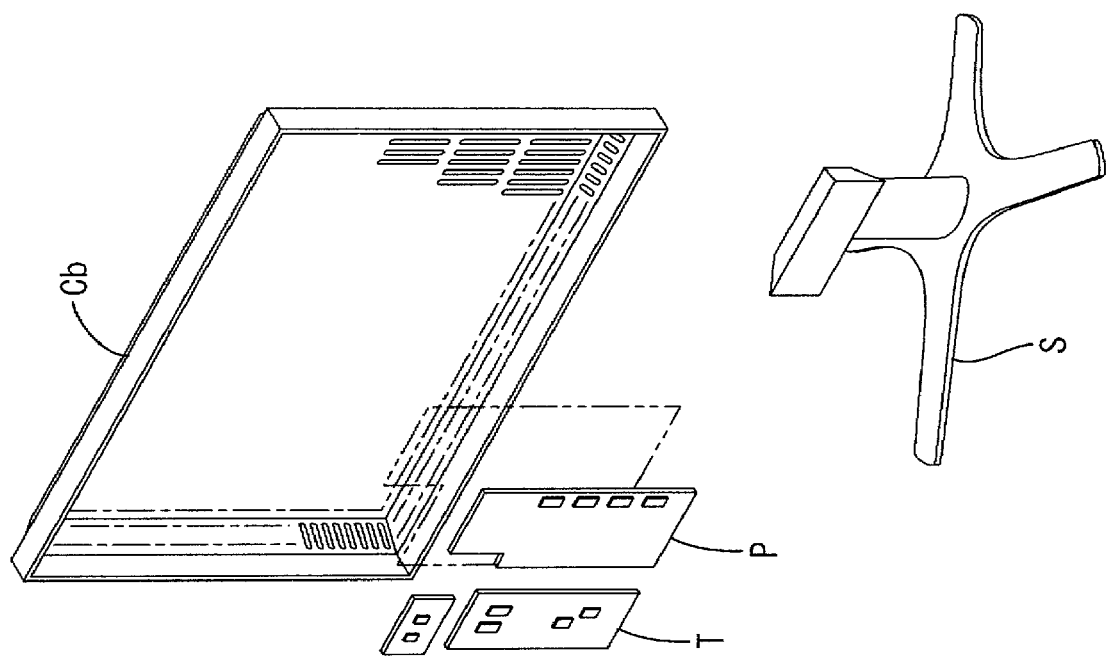
FIG. 1 is an exploded perspective view illustrating a schematic configuration of a television receiver apparatus according to a first embodiment of the present invention.
Figure 1:
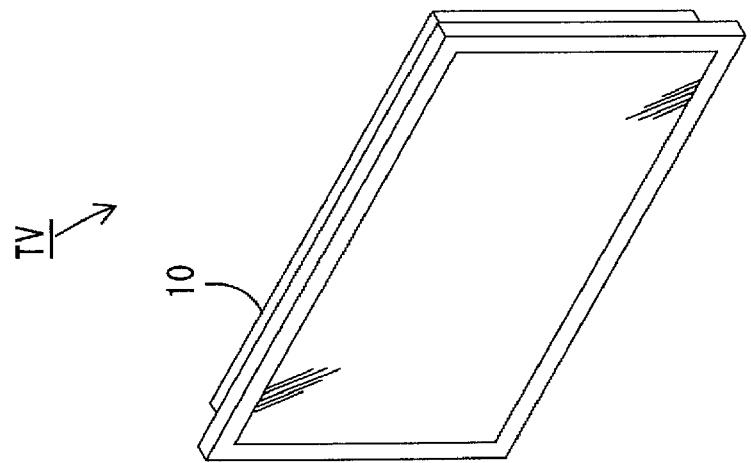
Figure 1:
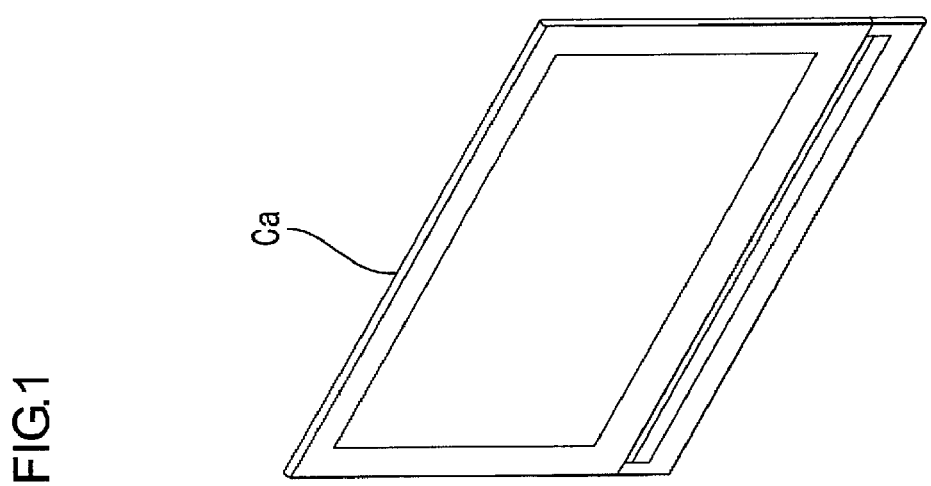
Figure 2:
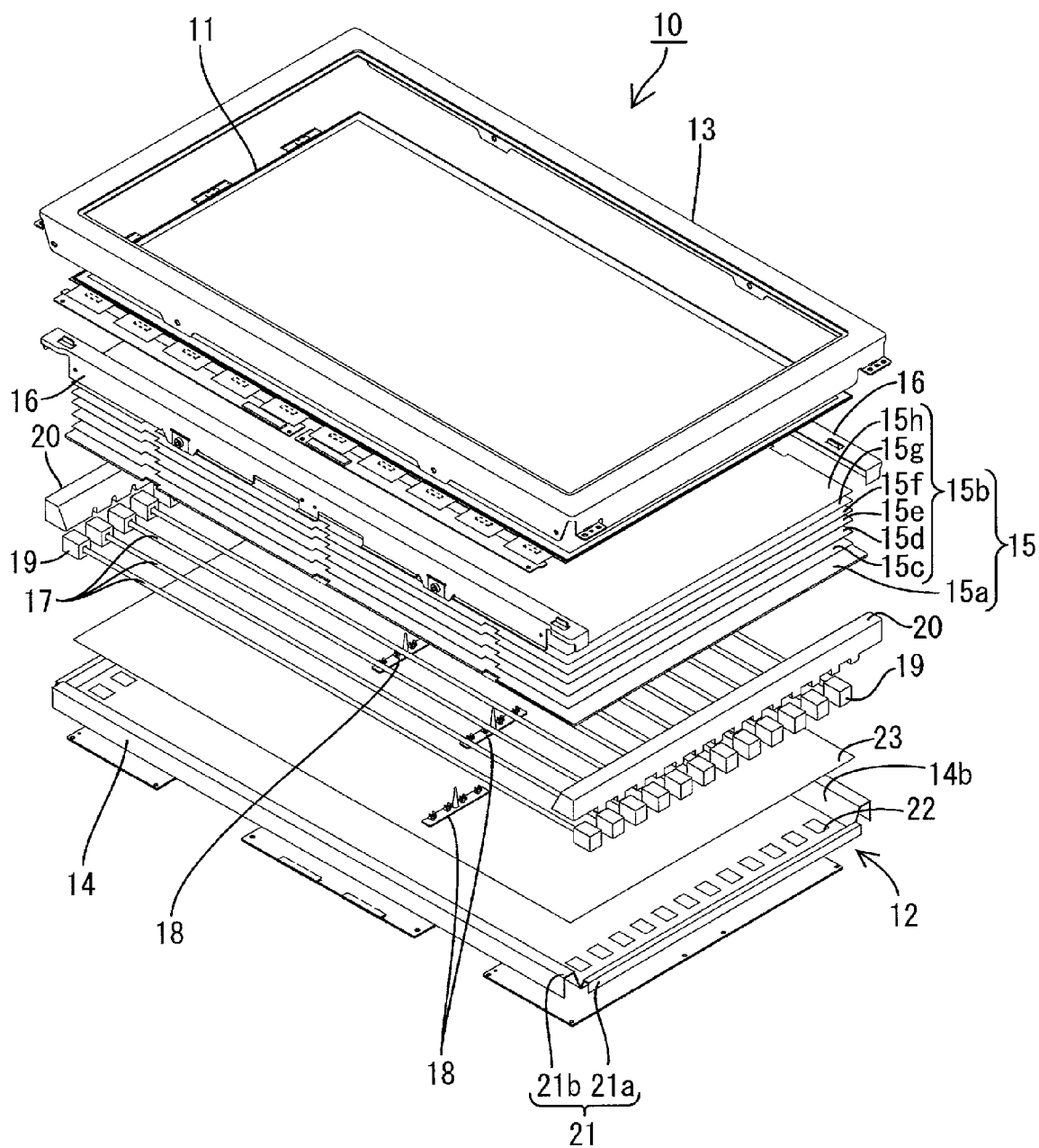
FIG. 2 is an exploded perspective view illustrating a schematic configuration of a liquid crystal display device included in the television receiver apparatus illustrated in FIG. 1.
Figure 3:
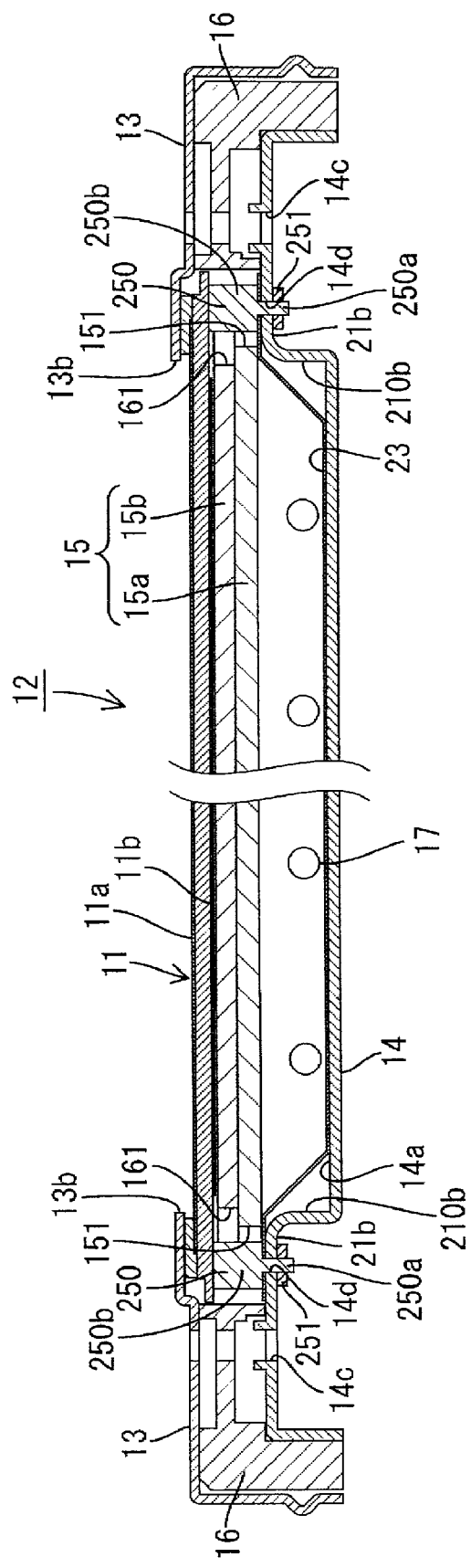
FIG. 3 is a cross-sectional view illustrating a first cross-sectional configuration of the liquid crystal display device illustrated in FIG. 2 in a short-side direction thereof.
Figure 4:
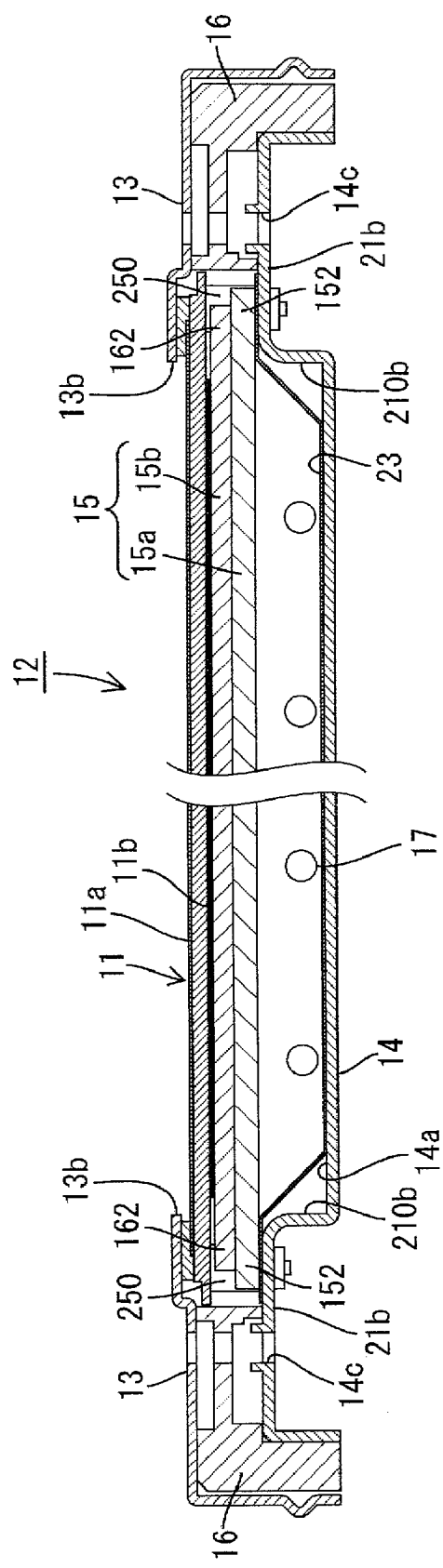
FIG. 4 is a cross-sectional view illustrating a second cross-sectional configuration of the liquid crystal display device illustrated in FIG. 2 in a short-side direction thereof.
Figure 5:
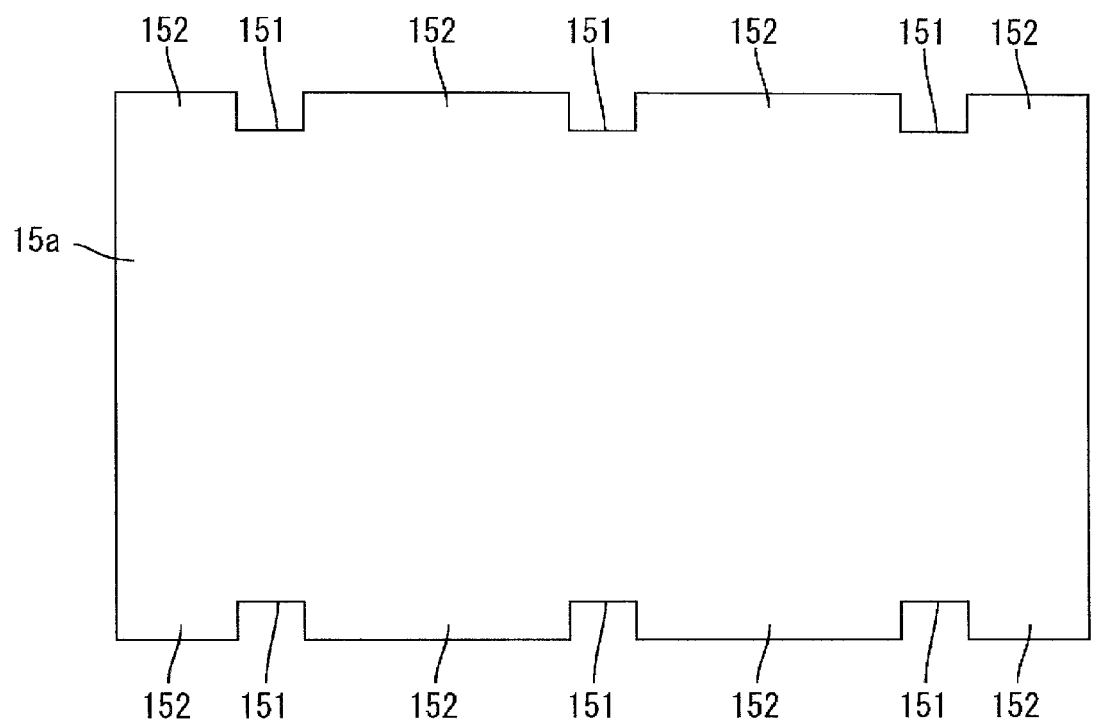
FIG. 5 is a schematic diagram illustrating a planar configuration of a diffusing plate included in the liquid crystal display device illustrated in FIG. 2.
Figure 6:
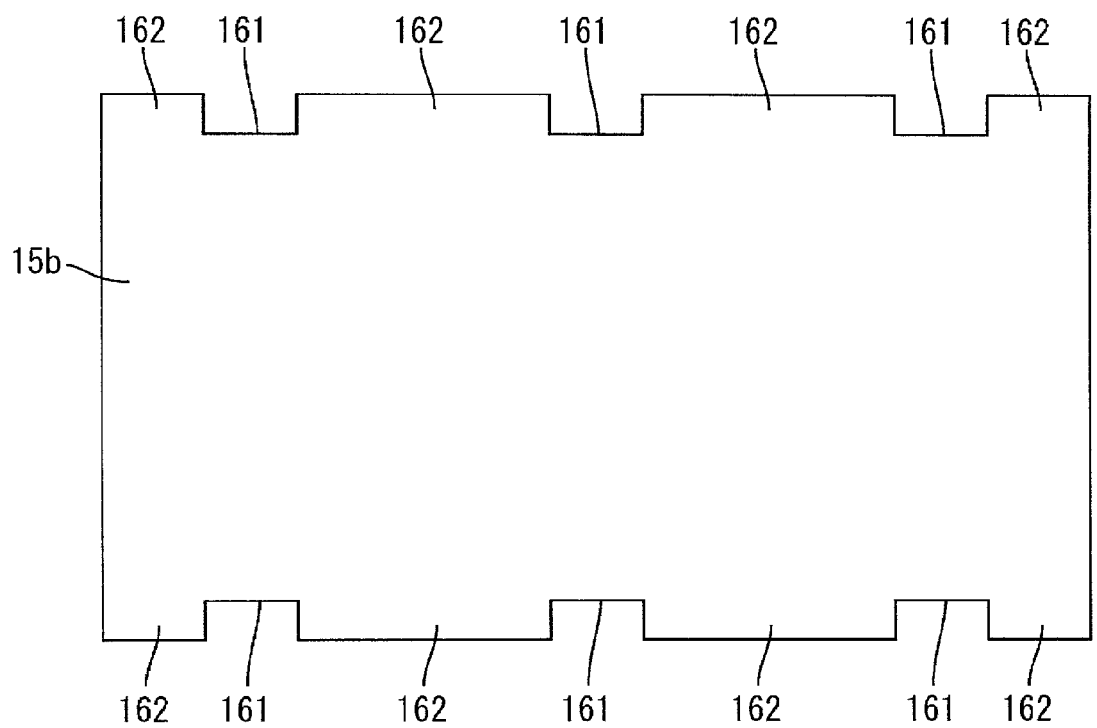
FIG. 6 is a schematic diagram illustrating a planar configuration of an optical sheet set included in the liquid crystal display device illustrated in FIG. 2.

FIG. 1 is an exploded perspective view illustrating a schematic configuration of a television receiver apparatus according to the present first embodiment. FIG. 2 is an exploded perspective view illustrating a schematic configuration of a liquid crystal display device included in the television receiver apparatus illustrated in FIG. 1. FIG. 3 is a cross-sectional view illustrating a first cross-sectional configuration of the liquid crystal display device illustrated in FIG. 2 in a short-side direction thereof. FIG. 4 is a cross-sectional view illustrating a second cross-sectional configuration of the liquid crystal display device illustrated in FIG. 2 in a short-side direction thereof. FIG. 5 is a schematic diagram illustrating a planar configuration of a diffusing plate included in the liquid crystal display device illustrated in FIG. 2. FIG. 6 is a schematic diagram illustrating a planar configuration of an optical sheet set included in the liquid crystal display device illustrated in FIG. 2.

As illustrated in FIG. 1, a television receiver apparatus TV according to the present embodiment includes a liquid crystal display device 10, front and rear cabinets Ca and Cb that house the liquid crystal display device 10 therebetween, a power source P, a tuner T and a stand S. The liquid crystal display device (display device) 10 having a horizontally long rectangular shape is housed in an upright position. As illustrated in FIG. 2, the liquid crystal display device 10 includes a liquid crystal panel 11 that is a display panel and a backlight unit (illumination device) 12 that is an external light source. The liquid crystal panel 11 and the backlight unit 12 are integrally held by a frame-like bezel 13 and the like.

Next, the liquid crystal panel 11 and the backlight unit 12 included in the liquid crystal display device 10 will be described (see FIGS. 2 to 6).

For the liquid crystal panel (display panel) 11, a pair of glass substrates is bonded together with a predetermined gap therebetween in which liquid crystals are sealed. On one of the glass substrates, a switching element (for example, a TFT) connected to a source wiring and a gate wiring that intersect each other at right angles, a pixel electrode connected to the switching element and an alignment film are arranged. On the other glass substrate, a color filter having colored portions of R (red), G (green) and B (blue) in a predetermined arrangement, a counter electrode and an alignment film are arranged. Polarizing plates 11a and 11b are arranged outside substrates (see FIGS. 3 and 4).

As illustrated in FIG. 2, the backlight unit 12 includes a substantially box-shaped chassis 14 opened to a light-outputting surface side (a side of the liquid crystal panel 11) an optical sheet 15 mounted so as to cover an opening 14b of the chassis 14 and a frame 16 arranged along a long side of the chassis 14 between the chassis 14 and the bezel 13. Furthermore, inside the chassis 14, a cold cathode tubes (light source) 17, a lamp clips 18 for mounting the cold cathode tubes 17 to the chassis 14 relay connectors 19 for making electrical connections at end parts of the cold cathode tubes 17 and holders 20 that covers the end parts of the cold cathode tubes 17 and the relay connectors 19. Moreover, in the backlight unit 12, the side of the optical sheet 15 is set closer to the light output side than the cold cathode tube 17. In the present embodiment, the light outputting part of the backlight unit 12 is on the light-outputting side (i.e., the side of the liquid crystal panel 11) of the optical sheet 15.

The chassis 14 is made of metal. It is sheet-metal processed in a shallow substantially box shape having a rectangular bottom plate and a folded outer-edge parts 21. The folded outer-edge parts 21 rises from the respective sides of the bottom plate and folded in a substantially U-shape (a folded outer-edge parts 21a in a short-side direction and a folded outer-edge parts 21b in a long-side direction). A plurality of mounting holes 22 for mounting the relay connectors 19 is provided in longitudinal end parts of the bottom plate of the chassis 14. As illustrated in FIGS. 3 and 4, fixing holes 14c are provided in the surface of the folded outer-edge parts 21b of the chassis 14. The bezel 13, the frame 16 and the chassis 14 are screwed together, for example. Furthermore, the folded outer-edge parts 21b support the optical sheet 15 with a reflection sheet 23 provided on an inner surface of the folded outer-edge part 21b. Accordingly, the inner surface of the folded outer-edge part 21b functions as a sheet supporting surface (sheet supporting portion).

The reflection sheet 23 is arranged on an inner surface side (a side of the surface opposing the cold cathode tube 17) of the bottom plate of the chassis 14. The reflection sheet 23 is made of synthetic resin, has a surface colored white that is a color with high light reflectivity, and is laid along the inside of the bottom plate surface of the chassis 14 so as to cover almost an entire area of the bottom plate surface of the chassis 14. As illustrated in FIG. 3, each long-side edge part of the reflection sheet 23 rises so as to cover the corresponding folded outer-edge part 21b of the chassis 14. It is sandwiched between the chassis 14 and the diffusing plate 15a and fixed. The reflection sheet 23 reflects light emitted from the cold cathode tube 17 toward the optical sheet 15.

Each cold cathode tube 17 is a linear light source having an elongated tubular shape. A large number of the cold cathode tubes 17 are housed in the chassis 14. The cold cathode tubes 17 are parallel to each other (i.e., in a parallel layout) with a longitudinal direction (axial direction) thereof aligned with the long-side direction of the chassis 14 (see FIG. 2). Moreover, the cold cathode tubes 17 are arranged slightly above the bottom plate (reflection sheet 23) of the chassis 14. End parts of the cold cathode tubes 17 fitted in respective relay connectors 19. The holders 20 are mounted so as to cover the relay connectors 19.

Each holder 20 is made of white synthetic resin and covers the end parts of the cold cathode tubes 17 as illustrated in FIG. 2. It has a elongated substantially box shape extending in the short-side direction of the chassis 14. The holder 20 is arranged so as to partially overlap the corresponding folded outer-edge part 21a in the short-side direction of the chassis 14. It forms a side wall of the backlight unit 12 together with the folded outer edge part 21a. Insertion pins (not illustrated) protrude from a surface of the holders 20 opposing the folded outer-edge part 21a of the chassis 14. The holders 20 are mounted to the chassis 14 with the insertion pins inserted in the respective insertion holes (not illustrated) provided in the surfaces of the folded outer-edge parts 21a of the chassis 14.

The optical sheet 15 is a member that changes output characteristics (for example, output angle, in-plane luminance distribution and the like) of light emitted from the cold cathode tube 17. As illustrated in FIG. 2, the optical sheet 15 includes the diffusing plate 15a and the optical sheet set 15b that is thinner than the diffusing plate 15a. Moreover, the optical sheet set 15b includes a lens sheet 15c arranged adjacent to the diffusing plate 15a, diffusing sheets 15d, 15e, 15f, and 15g, and a reflection type polarizing film 15h arrange on top of each other in this order from the diffusing plate 15a side.

The optical sheet 15 is adjacent to the liquid crystal panel 11 without any other members between the optical sheet 15 and the liquid crystal panel 11. As illustrated in FIG. 5, the diffusing plate 15a included in the optical sheet 15 has cutouts 151. Each cutout 151 is formed by cutting out a part of a long-side outer-edge part of the diffusing plate 15a such that the outer edge part steps inward in plan view. The diffusing plate 15a also has tabs 152. Each tab 152 projects farther to an outside than an edge of the cutout 151. Furthermore, as illustrated in FIG. 6 the lens sheet 15c, the diffusing sheets 15d, 15e, 15f, and 15g, and the reflection type polarizing film 15h of the optical sheet set 15b included in the optical sheet 15 have cutouts 161 formed by cutting out a part of long-side outer-edge parts thereof such that the outer-edge parts step inward in plan view. They also have tabs 162 that project further to the outside than edges of the cutouts 161. In other words, the diffusing plate 15a and the optical sheet set 15b included in the optical sheet have the long sides having the cutouts and tabs. The diffusing plate 15a and each sheet of the optical sheet set have three cutouts 151, 161 and four tabs 152, 162 at each long-side part thereof, respectively.

The diffusing plate 15a and the optical sheet set 15b having cutouts and tabs at the long-side parts thereof as described above and the liquid crystal panel 11 arranged on the light-outputting side of the optical sheet 15 are held between the chassis 14 and the bezel 13. Specifically, as illustrated in FIG. 4, the optical sheet 15 including the diffusing plate 15a and the optical sheet group 15b is arranged such that the tabs 152 of the diffusing plate 15a and the tabs 162 of the optical sheet set 15b are supported by the folded outer-edge parts 21b of the chassis 14, which are the sheet supporting portions, and such that sandwiched between the respective folded outer-edge parts 21b and the liquid crystal panel 11. On the other hand, as illustrated in FIG. 3, the liquid crystal panel 11 is supported by the projections (panel supporting member) 250 provided on the inner surface of the folded outer-edge parts 21b of the chassis 14 and is held between the projections 250 and the bezel 13. In the present embodiment, an elastic sponge-like buffer is provided between the liquid crystal panel 11 and the bezel 13.

Each projection 250 that supports the liquid crystal panel 11 is made of a metallic material and provided at a position overlapping the respective cutouts 151, 161 of the diffusing plate 15a and the optical sheet set 15b. It is formed so as to be inserted through the cutouts 151, 161 and protrude from the cutouts 151, 161 to the liquid crystal panel 11 side. The projection 250 includes a projection main body 250b and a male screw part 250a connected to the projection main body 250b. The projection 250 is fixed to the chassis 14 by inserting the male screw part 250a in the hole 14c of the folded outer-edge part 21b of the chassis 14 and screwing a female screw (nut) 14d on the male screw part 250a on a rear-surface side of the folded outer-edge part 21b. Moreover, in the present embodiment, in order to insert the male screw part 250a of the projection 250, a coaxial hole is also formed on the reflection sheet 23 together with the hole 14d on the chassis 14.

The diffusing plate 15a and the optical sheet set 15b are supported by the chassis 14 with the tabs 152, 162 thereof. The cutouts 151, 161 are stepped inward such that inner edges thereof overlap inside-edge parts 210b (wall portions surrounding the cold cathode tubes 17) of the folded outer-edge parts 21b of the chassis 14, that is, near inside-edge parts 13b of the bezel 13. Therefore, small parts of inner edges of the cutouts 151, 161 are supported by the inner surfaces of the folded outer-edge parts 21b.

Moreover, FIG. 3 that is referenced in the present embodiment shows the part of the diffusing plate 15a and the optical sheet set 15b in which the cutouts 151, 161 are provided, respectively, in a cross-sectional configuration taken along a short-side direction1. FIG. 4 shows the part of the diffusing plate 15a and the optical sheet set 15b in which the tabs 152, 162 are provided, respectively, in a cross-sectional configuration taken along a short-side direction.

On the other hand, the diffusing plate 15a of the optical sheet 15 is a synthetic resin plate-like member including dispersed light-scattering particles. It diffuses linear light emitted from each cold cathode tube 17, which is a linear light source (tubular light source). The diffusing plate 15a has a thickness of 2 mm and a total light transmittance of approximately 85%. The optical sheet set 15b other than the diffusing plate 15a is held between the diffusing plate 15a and the liquid crystal panel 11. As described above, It includes the lens sheet 15c arranged adjacent closer to the light-outputting side than the diffusing plate 15a, the diffusing sheets 15d, 15e, 15f, and 15g, and the reflection type polarizing film 15h on top of each other. The lens sheet 15c is configured such that linear convex lenses (convex cylindrical lenses, lenticular lenses) are formed in juxtaposition on a front surface (light-outputting surface) of a synthetic-resin translucent base material, and is arranged so that a longitudinal direction of the cold cathode tube 17 and a longitudinal direction of the convex lenses are parallel to each other. Moreover, the thickness of the lens sheet 15c is set to 0.5 mm and the pitch between the convex lenses is set to 0.15 mm. The diffusing sheets 15d, 15e, 15f, and 15g are configured by pasting together diffusion layers dispersedly mixed with light-scattering particles onto a front surface of a synthetic-resin translucent base material. The diffusing sheets 15d, 15e, 15f, and 15g have a thickness of 0.22 mm and the light transmissive base material has a thickness of 0.188 mm. The reflection type polarizing film 15h is configured so as to transmit a part of light outputted from the diffusing sheets 15d, 15e, 15f, and 15g while reflecting the rest of the light, and functions to enhance the light use efficiency with respect to pixels of the liquid crystal panel 11. In this case, the reflected light is to be reused by reflection off of the reflection sheet 23 and the like.

In the backlight unit 12 according to the present embodiment, cold cathode tubes 17 are arranged parallel to each other in a space (light source holding space) formed between the reflection sheet 23 arranged on the inner-surface side of the chassis 14 and the diffusing plate 15a of the optical sheet 15. The cold cathode tube 17 used in the present embodiment has a tube diameter of 4.0 mm; the distance between the cold cathode tube 17 and the reflection sheet 23 is set to 0.8 mm; the distance between adjacent cold cathode tubes 17 is set to 16.4 mm; and the distance between the cold cathode tube 17 and the diffusing plate 15a is set to 2.7 mm. Namely, the distances between components in the backlight unit 12 are reduced. In particular, the distance between the cold cathode tube 17 and the diffusing plate 15a and the distance between the cold cathode tube 17 and the reflection sheet 23 are reduced. In addition to such reduction of the backlight unit 12 in thickness, the liquid crystal panel 11 and the optical sheet 15 are arranged adjacent to each other without any other components therebetween in order to reduce the distance between the liquid crystal panel 11 and the optical sheet 15 as much as possible. As a result, the liquid crystal display device 10 (i.e., a thickness from a front surface of the liquid crystal panel 11 to a rear surface of the backlight unit 12) having the thickness of 16 mm and the television receiver apparatus TV (i.e., a thickness from a front surface of the front-side cabinet Ca to a rear surface of the rear-side cabinet Cb) having the thickness of 34 mm are provided. Namely, a thin television receiver apparatus is provided.

With a television receiver apparatus TV according to the present embodiment as described above, the backlight unit 12 included in the liquid crystal display device 10 of the television receiver apparatus TV includes the diffusing plate 15a and the optical sheet set 15b configured as described above as the optical sheet 15. By configuring the liquid crystal display device 10 such that the optical sheet 15 and the liquid crystal panel 11 are adjacent to each other without any other components therebetween, the thin liquid crystal display device 10 can be provided. When the liquid crystal panel 11 and the optical sheet 15 are adjacent to each other in this manner, the optical sheet 15 may not be freely expanding or contracting due to a pressing force applied from the liquid crystal panel 11 side caused by the weight of the liquid crystal panel 11 or the like.

Therefore, in the present embodiment, cutouts and tabs (the cutouts 151, 161 and the tabs 152, 162) are provided on the outer-edge parts of the optical sheet 15, and the tabs 151, 161 of the optical sheet 15 are supported by the folded outer-edge parts 21b that are sheet supporting members. The projections 250 provided on the folded outer-edge parts 21b are inserted in the cutouts 151, 161 of the optical sheet 15 so as to support the liquid crystal panel 11. Accordingly, even in the thin liquid crystal display device 10 without any other components between the liquid crystal panel 11 and the optical sheet 15, a pressing force from the liquid crystal panel 11 becomes less likely to affect the optical sheet 15. As a result, the optical sheet 15 can be freely expand or contract in the thin device. Since the optical sheet 15 can freely expand or contract even when a thermal expansion occurs due to heat generated by the cold cathode tubes 17, a central part of the optical sheet 15 is less likely to bend or wrinkle.

If the optical sheet does not have cutouts and tabs and the liquid crystal panel 11 is supported at the outside of the optical sheet 15 by the projection 250, a space for a mounting part (supporting surface) of the optical sheet 15 is required in addition to a space for the projections 250. Namely, a frame region that is a non-display area is increased by the space and an effective display area is reduced. The liquid crystal display device according to the present embodiment does not require such spaces separately (a space for projections and a space for supporting the panel) provided parallel to each other, a wide display area is provided.

Second Embodiment

Figure 7:
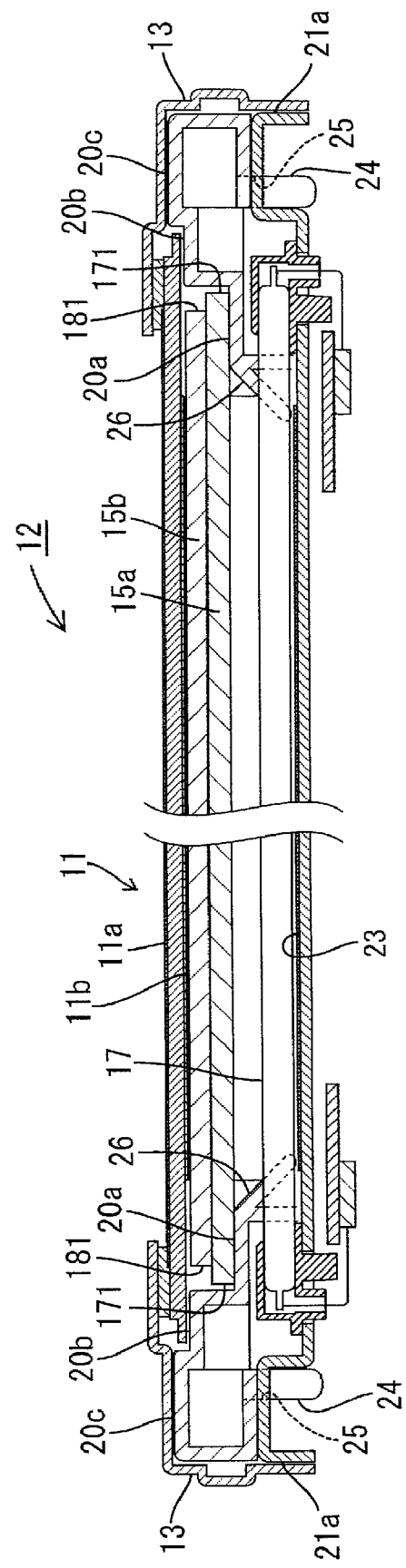
FIG. 7 is a cross-sectional view illustrating a first cross-sectional configuration of a liquid crystal display device included in a television receiver apparatus according to a second embodiment in a short-side direction thereof.
Figure 8:
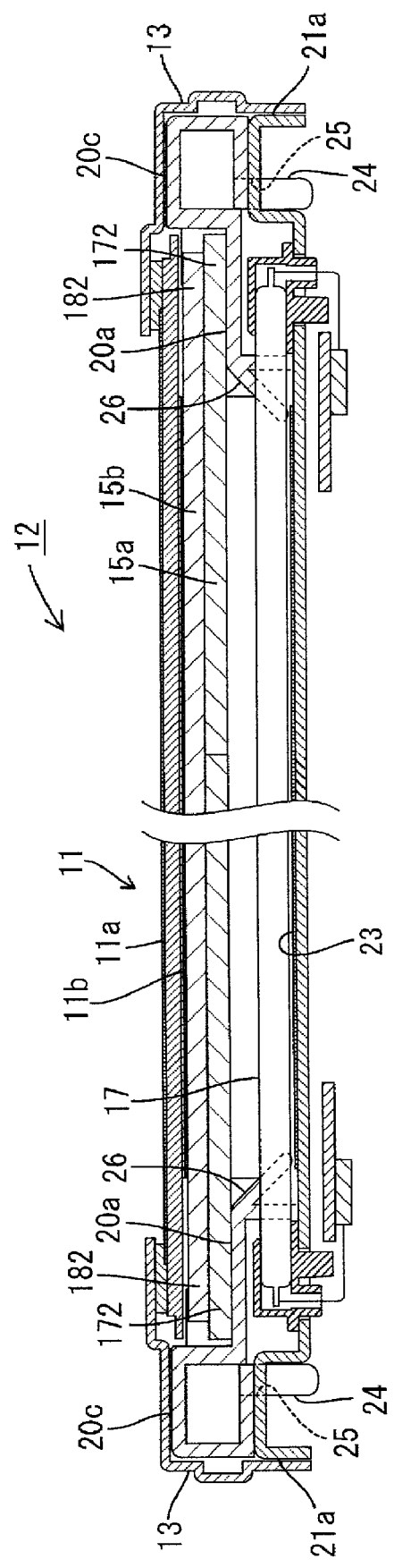
FIG. 8 is a cross-sectional view illustrating a second cross-sectional configuration of the liquid crystal display device included in the television receiver apparatus according to the second embodiment in a long-side direction thereof.

Next, a television receiver apparatus according to a second embodiment of the present invention will be described. The television receiver apparatus according to the second embodiment differs from that of the first embodiment in the configuration of the optical sheet 15 included in the backlight unit 12 and in the holding configuration of the optical sheet 15 and the liquid crystal panel 11. Since other configurations are about the same as the television receiver apparatus TV according to the first embodiment, a description thereof will be omitted. FIG. 7 is a cross-sectional view illustrating a first cross-sectional configuration of a liquid crystal display device in a long-side direction thereof, and FIG. 8 is a cross-sectional view illustrating a second cross-sectional configuration of the liquid crystal display device in a long-side direction thereof. In addition, FIG. 9 is a schematic diagram illustrating a planar configuration of a diffusing plate included in the liquid crystal display device, and FIG. 10 is a schematic diagram illustrating a planar configuration of an optical sheet set included in the liquid crystal display device.

Figure 9:
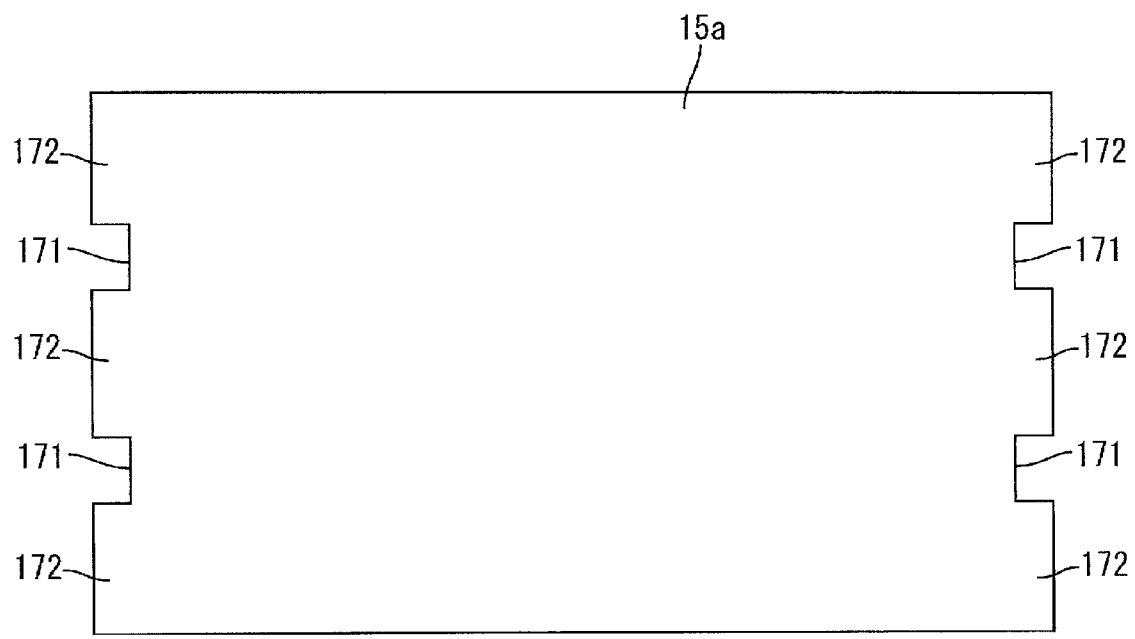
FIG. 9 is a schematic diagram illustrating a planar configuration of a diffusing plate included in the liquid crystal display device included in the television receiver apparatus according to the second embodiment.
Figure 10:
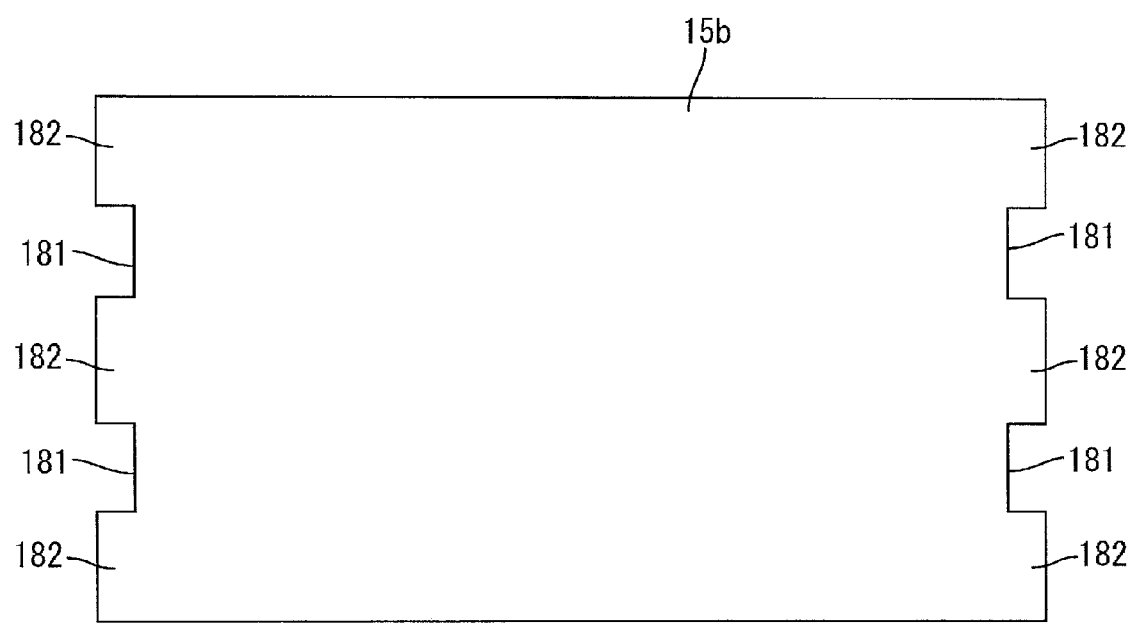
FIG. 10 is a schematic diagram illustrating a planar configuration of an optical sheet set included in the liquid crystal display device included in the television receiver apparatus according to the second embodiment.

With the television receiver apparatus TV according to the second embodiment, as illustrated in FIG. 9, a diffusing plate 15a included in the optical sheet 15 in a backlight unit 12 of a liquid crystal display device 10 has cutouts 171. Each cutout 171 is formed by cutting out a part of an outer-edge part of the short side of the diffusing plate 15a such that the outer-edge part steps inward in plan view. The diffusing plate 15a also has tabs 172. Each tab projects farther to an outside than an edge of the cutout 171. As illustrated in FIG. 10, a lens sheet 15c, diffusing sheets 15d, 15e, 15f, and 15g, and a reflection type polarizing film 15h of an optical sheet set 15b included in the optical sheet 15 also have cutouts 181 and tabs 182. Each cutout 181 is formed by cutting out a part of an outer-edge part of the short side of the optical sheet set 15b such that the outer-edge part steps inward side in plan view. Each tab 182 projects farther to an outside than an edge of the cutout 181. In other words, the diffusing plate 15a and the optical sheet set 15b included in the optical sheet 15 are provided such that short-side parts thereof have a cutout and a tab. The diffusing plate 15a and each sheet of the optical sheet set 15b have two cutouts 171, 181 and three tabs 172, 182 at the short-side parts thereof, respectively.

Figure 16:
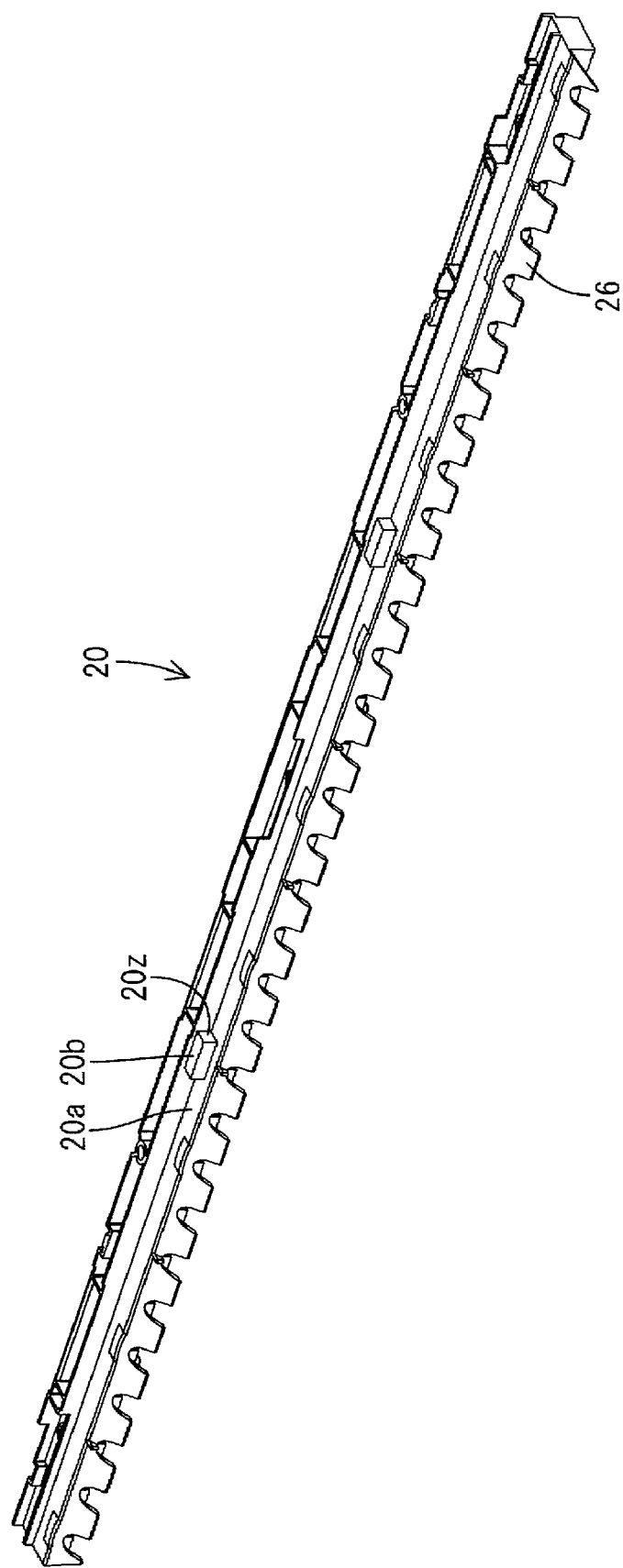
FIG. 16 is a perspective view illustrating a configuration of a holder.

Furthermore, as illustrated in FIGS. 7 and 8, the optical sheet 15 including the diffusing plate 15a and the optical sheet set 15b is arranged so as to be held between holders (light source covering member) 20 arranged on folded outer-edge parts 21a formed on short-side parts of a chassis 14 and a liquid crystal panel 11. Each holder 20 covers end parts of the cold cathode tubes 17 and, as illustrated in FIG. 16, has an elongated substantially box shape extending in the short-side direction of the chassis 14. The holder 20 has a stepped surface on the front side. The optical sheet 15 and the liquid crystal panel 11 are placed on the stepped surface. The holder 20 is arranged so as to partially overlap with the folded outer-edge part 21a in the short-side direction of the chassis 14. It forms a side wall of the backlight unit 12 together with the folded outer-edge part 21a. Insertion pins 24 protrude from surfaces of the holders 20 opposing the folded outer-edge parts 21a of the chassis 14. Each holder 20 is mounted to the chassis 14 by inserting the insertion pin 24 in an insertion hole 25 of the folded outer-edge part 21a of the chassis 14. The stepped surface of the holder 20 has three surfaces parallel to a bottom plate surface of the chassis 14. A short side edge part of the diffusing plate 15a is mounted on a lowermost first surface 20a. In addition, an inclined cover 26 that inclines toward the bottom plate surface of the chassis 14 extends from the first surface 20a. A short-side edge part of the liquid crystal panel 11 is mounted on a second surface 20b of the stepped surface of the holder 20. A topmost third surface 20c of the stepped surface of the holder 20 is arranged at a position overlapping the folded outer-edge part 21a of the chassis 14 and is in contact with the bezel 13.

Similarly, in the present embodiment, the optical sheet 15 is adjacent to the liquid crystal panel 11 without any other members between the optical sheet 15 and the liquid crystal panel 11. In addition, the diffusing plate 15a and the optical sheet set 15b having cutouts and tabs on short-side parts thereof as described above, and the liquid crystal panel 11 arranged on the light-outputting side of the optical sheet 15 including the diffusing plate 15a and the optical sheet set 15b, are held between the holders 20 and the bezel 13. Specifically, as illustrated in FIG. 8, tabs 172 of the diffusing plate 15a and tabs 182 of the optical sheet set 15b are supported by the first surface 20a of the holder 20, which is the sheet supporting portion, and the optical sheet 15 including the diffusing plate 15a and the optical sheet set 15b is arranged so as to be held between the first surface 20a and the liquid crystal panel 11. On the other hand, as illustrated in FIG. 7, the liquid crystal panel 11 is supported by the second surface 20b that is an upper surface of a projection (panel supporting member) 20z formed so as to partially protrude on the first surface 20a and is arranged so as to be held between the second surface 20b of the projection 20z and the bezel 13.

The projection 20z in this case is configured as a partially-protruding upper surface of the holder 20. In other words, the projection 20z is formed by performing molding while having the projection 20z partially protrude from the first surface 20a during a molding process. In addition, the projection 20z is provided at a position overlapping the respective cutouts 171, 181 of the diffusing plate 15a and the optical sheet set 15b, and is formed so as to be inserted through the cutouts 171, 181 and protrude from the cutouts 171, 181 to the side of the liquid crystal panel 11.

FIG. 7 that is referenced in the present embodiment illustrates a cross-sectional configuration taken along a long-side direction of portions of the diffusing plate 15a and the optical sheet set 15b where the cutouts 171, 181 are formed, while FIG. 8 illustrates a cross-sectional configuration taken along a long-side direction of portions of the diffusing plate 15a and the optical sheet set 15b where the tabs 172, 182 are formed.

Similarly, with the television receiver apparatus TV according to the present embodiment, which is configured as described above, the backlight unit 12 included in the liquid crystal display device 10 of the television receiver apparatus TV includes the diffusing plate 15a and the optical sheet set 15b configured as described above as the optical sheet 15. By configuring the liquid crystal display device 10 such that the optical sheet 15 and the liquid crystal panel 11 are adjacent to each other without any other members therebetween, the thickness of the liquid crystal display device 10 can be reduced. In addition, cutouts and tabs (the cutouts 171, 181 and the tabs 172, 182) are formed on the outer-edge part of the optical sheet 15, and the tabs 171, 181 of the optical sheet 15 are supported by the first surface 20a of the holder 20 that is a sheet supporting member while the projection 20z formed on the first surface 20a is inserted through the cutouts 171, 181 of the optical sheet 15 and supports the liquid crystal panel 11. Accordingly, even in the thin liquid crystal display device 10 having any other members between the liquid crystal panel 11 and the optical sheet 15, a pressing force from the liquid crystal panel 11 is less likely to affect the optical sheet 15. As a result, the optical sheet 15 can be freely expand or contract in the thin device. Since the optical sheet 15 can freely expand or contract even when a thermal expansion occurs due to heat generated by the cold cathode tubes 17, a central part of the optical sheet 15 is less likely to bend or wrinkle.

If the optical sheet 15 does not have cutouts or tabs and the liquid crystal panel 11 is supported at the outside of the optical sheet 15 by the projection 20z, a space (supporting surface) for the optical sheet 15 is required in addition to a space for the projection 20z. As a result, a frame area that is a non-display area is increased by the space and an effective display area is reduced. Since the liquid crystal display device according to the present embodiment does not require such spaces separately (the space for the projections and a space for supporting the panel) provided parallel to each other, a wide display area is provided.

Third Embodiment

Figure 11:
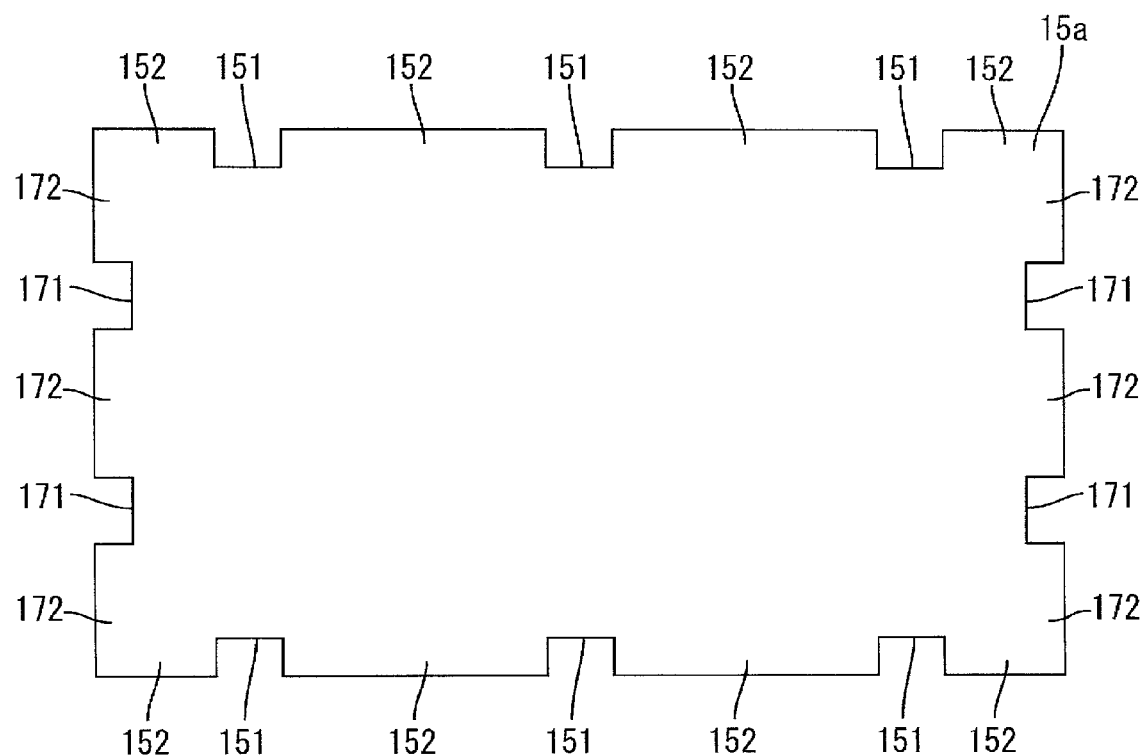
FIG. 11 is a schematic diagram illustrating a planar configuration of a diffusing plate included in a liquid crystal display device included in a television receiver apparatus according to a third embodiment.
Figure 12:
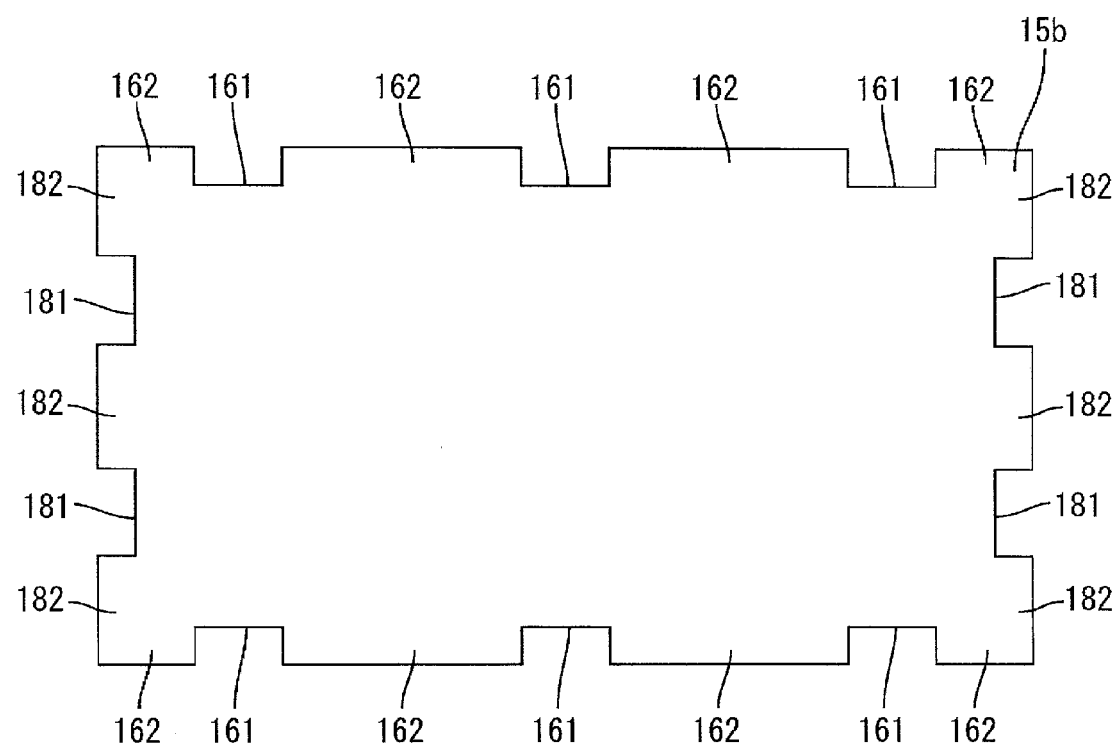
FIG. 12 is a schematic diagram illustrating a planar configuration of an optical sheet set included in the liquid crystal display device included in the television receiver apparatus according to the third embodiment.

Next, a television receiver apparatus according to a third embodiment of the present invention will be described. The television receiver apparatus according to the third embodiment differs from that of the first embodiment in the configuration of the optical sheet 15 included in the backlight unit 12 and in the holding configuration of the optical sheet 15 and the liquid crystal panel 11. Since other configurations are about the same as the television receiver apparatus TV according to the first embodiment, a description thereof will be omitted. FIG. 11 is a schematic diagram illustrating a planar configuration of a diffusing plate included in a liquid crystal display device, and FIG. 12 is a schematic diagram illustrating a planar configuration of an optical sheet set included in the liquid crystal display device.

With the television receiver apparatus TV according to the third embodiment, as illustrated in FIG. 11, a diffusing plate 15a included in the optical sheet 15 in a backlight unit 12 of a liquid crystal display device 10 has cutouts 151, 171 and tabs 152, 172. The cutouts 151, 171 are formed by cutting out parts of outer-edge parts of short sides and long sides the diffusing plate 15a such that the outer edge parts step inward in plan view. The tabs 152, 172 protrude further to outsides than the edges of the cutouts 151, 171. As illustrated in FIG. 12, a lens sheet 15c, diffusing sheets 15d, 15e, 15f, and 15g, and a reflection type polarizing film 15h of the optical sheet set 15b included in the optical sheet 15 also include cutouts 161, 181 and tabs 162, 182. The cutouts 161, 181 are formed by cutting out parts of outer-edge parts of short sides and long sides of the optical sheet set 15b such that the outer edge parts step inward in plan view. The tabs 162, 182 project further to outsides than the edges of cutouts 161, 181. In other words, the diffusing plate 15a and the optical sheet set 15b included in the optical sheet 15 has cutouts and tabs at the short sides and the long sides thereof. The diffusing plate 15a and each sheet of the optical sheet set 15b have two cutouts 171, 181 and three tabs 172, 182 at the short-side parts and three cutouts 151, 161 and four tabs 152, 162 at the long-side parts, respectively.

Furthermore, in the same manner as illustrated in FIGS. 7 and 8, the optical sheet 15 including the diffusing plate 15a and the optical sheet set 15b is arranged so as to be held at the short-side part thereof between holders (light source covering member) 20 arranged on folded outer-edge parts 21a formed on a short-side part of a chassis 14 and a liquid crystal panel 11. In other words, the optical sheet 15 is adjacent to the liquid crystal panel 11 without any other members between the optical sheet 15 and the liquid crystal panel 11. Moreover, the diffusing plate 15a and the optical sheet set 15b having cutouts and tabs on short-side parts thereof and the liquid crystal panel 11 arranged on the light-outputting side of the optical sheet 15 made up of the diffusing plate 15a and the optical sheet set 15b are held between the holder 20 and the bezel 13. Specifically, in the same manner as illustrated in FIG. 8, the tabs 172 of the diffusing plate 15a and the tabs 182 of the optical sheet set 15b are supported by a first surface 20a of the holder 20, which is the sheet supporting portion, and the optical sheet 15 including the diffusing plate 15a and the optical sheet set 15b is arranged so as to be held between the first surface 20a and the liquid crystal panel 11. On the other hand, in the same manner as illustrated in FIG. 7, the liquid crystal panel 11 is supported by a second surface 20b that is an upper surface of a projection (panel supporting member) 20z formed so as to partially protrude on the first surface 20a and is arranged so as to be held between the second surface 20b of the projection 20z and the bezel 13.

Meanwhile, in the same manner as illustrated in FIGS. 3 and 4, the optical sheet 15 including the diffusing plate 15a and the optical sheet set 15b is arranged so as to be held at the long-side part thereof between a folded outer-edge part 21b of the chassis 14 and the liquid crystal panel 11. In other words, the optical sheet 15 is adjacent to the liquid crystal panel 11 without any other members between the optical sheet 15 and the liquid crystal panel 11. Furthermore, the diffusing plate 15a and the optical sheet set 15b having cutouts and tabs at long-side parts thereof and the liquid crystal panel 11 arranged on the light-outputting side of the optical sheet 15 including the diffusing plate 15a and the optical sheet set 15b are held between the folded outer-edge parts 21b of the chassis 14 and the bezel 13. Specifically, in the same manner as illustrated in FIG. 4, the tabs 152 of the diffusing plate 15a and the tabs 162 of the optical sheet set 15b are supported by the folded outer-edge parts 21b of the chassis 14, which is the sheet supporting portion and the optical sheet 15 including the diffusing plate 15a and the optical sheet set 15b is arranged so as to be held between the folded outer-edge parts 21b and the liquid crystal panel 11. On the other hand, in the same manner as illustrated in FIG. 3, the liquid crystal panel 11 is supported by projections (panel supporting member) 250 formed on the inner surface of the folded outer-edge parts 21b of the chassis 14 and arranged so as to be held between the projection 250 and the bezel 13.

Similarly, with the television receiver apparatus TV according to the present embodiment as described above, the backlight unit 12 included in the liquid crystal display device 10 of the television receiver apparatus TV includes the diffusing plate 15a and the optical sheet set 15b configured as described above as the optical sheet 15. By configuring the liquid crystal display device 10 such that the optical sheet 15 and the liquid crystal panel 11 are adjacent to each other without any other members therebetween, the thickness of the liquid crystal display device 10 can be reduced. In addition, cutouts and tabs (the cutouts 171, 181, 151, 161 and the tabs 172, 182, 152, 162) are formed on the outer-edge parts of the short-side part and long-side part of the optical sheet 15. At the short-side part, the tabs 171, 181 of the optical sheet 15 are supported by the first surface 20a of the holder 20 that is a sheet supporting member while the projection 20z formed on the first surface 20a is inserted through the cutouts 171, 181 of the optical sheet 15 and supports the liquid crystal panel 11. Furthermore, at the long-side part, the tabs 151, 161 of the optical sheet 15 are supported by the folded outer-edge parts 21b of the chassis 14, which are sheet supporting members, while the projections 250 formed on the folded outer-edge parts 21b are inserted through the cutouts 152, 162 of the optical sheet 15 and support the liquid crystal panel 11.

Accordingly, even in the thin liquid crystal display device 10 according to the present embodiment having any other members between the liquid crystal panel 11 and the optical sheet 15, a pressing force from the liquid crystal panel 11 is less likely to affect the optical sheet 15. As a result, the optical sheet 15 can be freely expand or contract in the thin device. Since the optical sheet 15 can freely expand or contract even when a thermal expansion occurs due to heat generated by the cold cathode tube 17, a central part of the optical sheet 15 is less likely to bend or wrinkle.

If the optical sheet 15 does not have cutouts or tabs and the liquid crystal panel 11 is supported at the outsides of the optical sheet 15 by the projection 20z and the projection 250, a space (supporting surface) for the optical sheet 15 is required in addition to spaces for projection 20z and the projection 250 on outer-edge parts of the short-side part and the long-side part. As a result, a frame area that is a non-display area is increased by the space and an effective display area is reduced. Since the liquid crystal display device according to the present embodiment does not require such spaces separately (a projection-forming space and a panel-mounting space) provided parallel to each other, a wide display area is provided.

Other Embodiments

While preferred embodiments of the present invention have been disclosed, the present invention is not limited to the embodiments disclosed by the above description and accompanying drawings and, for example, the embodiments described below also fall within the technical scope of the present invention.

Figure 13:
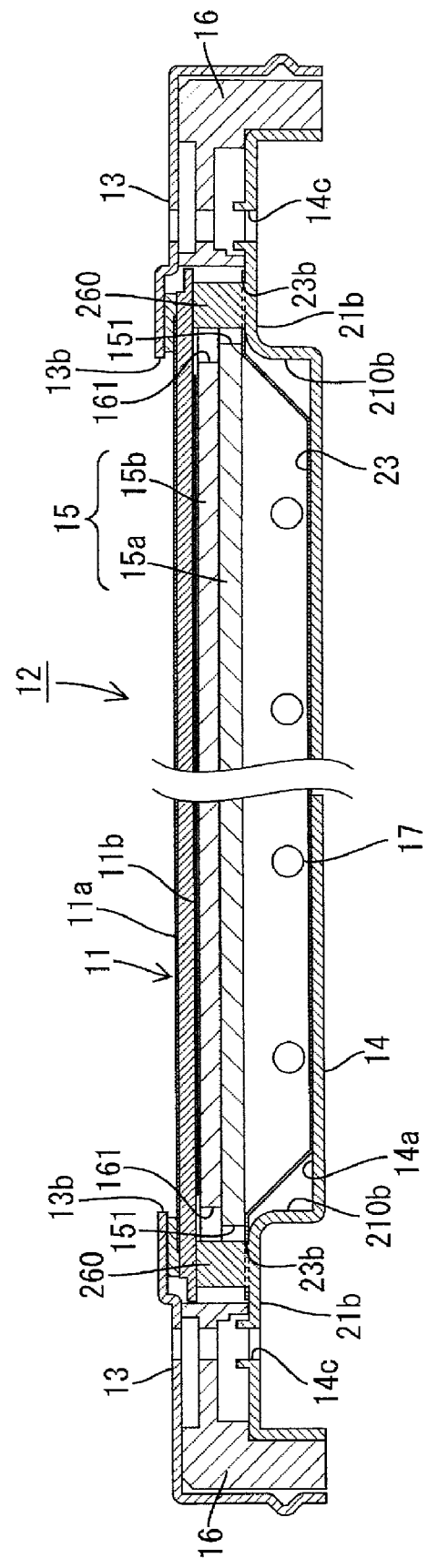
FIG. 13 is a cross-sectional view illustrating a modification of a panel supporting member.

(1) In the first embodiment described above, the projections 250 made of metal and provided as panel supporting members are inserted in the hole 14b of the chassis 14 and fixed with screws. However, projections 260 illustrated in FIG. 13 may be welded to the folded outer-edge parts 21b of the chassis 14, which are sheet supporting portions. The projections 260 welded to the chassis 14 also provide reliable panel support. In this case, a projection insertion holes 23b are provided in the reflection sheet 23 and the projections 260 are inserted in the projection insertion holes 23b for support of the liquid crystal panel 11.

Figure 14:
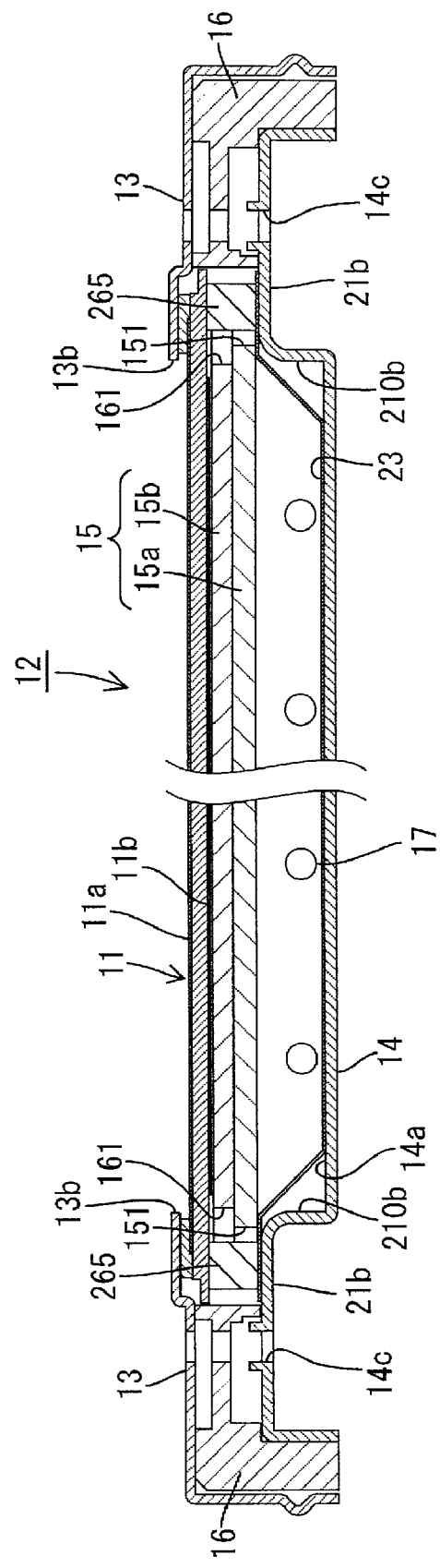
FIG. 14 is a cross-sectional view illustrating a modification of a panel supporting member.

(2) In the first embodiment described above, the projections 250 made of metal and provided as a panel supporting members are inserted in the holes 14b of the chassis 14. However, resin projections 265 illustrated in FIG. 14 can alternatively be used. In this case, the projections 265 can be arranged on the reflection sheet 23 by adhesion.

Figure 15:
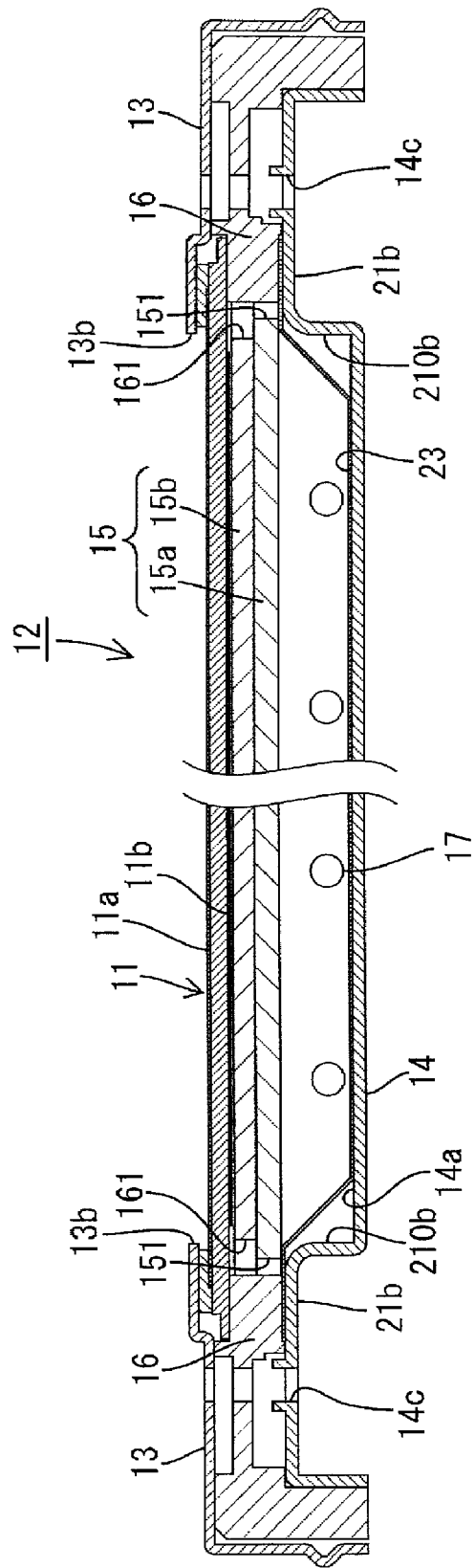
FIG. 15 is a cross-sectional view illustrating a modification of a panel supporting member.

(3) Furthermore, as illustrated in FIG. 15, frames 16 provided between the chassis 14 and the bezel 13 can be extended inward so as to be sandwiched between the liquid crystal panel 11 and the chassis 14 and used as a panel supporting members. In other words, longitudinal frames 16 arranged on outside surface of the outer-edge parts 21*b* of the chassis 14 along the outer-edge parts 21*b* of the chassis 14 can be configured as panel supporting members by extending a part of each frame 16 inward (to the liquid crystal panel 11 side) in plan view so as to support the liquid crystal panel 11.

(4) The cold cathode tubes are used as a light source in the embodiments described above. However, other discharge tubes such as a hot cathode tube can be used.

The invention claimed is:

1. A display device comprising:
a light source;
a chassis housing the light source;
a display panel for providing display using light from the light source; and
an optical sheet arranged between the light source and the display panel, wherein:
the display panel and the optical sheet are adjacent to each other with no other members therebetween;
the chassis has a sheet supporting portion for supporting the optical sheet at an outer-edge part and a panel supporting member for supporting the display panel is arranged on the sheet supporting portion;
the optical sheet has an outer edge part having a cutout formed by cutting out a part of the outer edge part such that the outer edge part steps inward in plan view and a tab projecting farther to an outside than an edge of the cutout;
the tab is supported by the sheet supporting member and;
the panel supporting member passes through the cutout and supports the display panel.

2. The display device according to claim 1, wherein:
the light source includes longitudinal linear light sources arranged in parallel; and
the chassis has the sheet supporting portion formed along a longitudinal direction of the light source.

3. The display device according to claim 1, wherein the panel supporting member is screwed to the sheet supporting portion.

4. The display device according to claim 1, wherein the panel supporting member is a member welded to the sheet supporting portion so as to project from the sheet supporting portion.

5. The display device according to claim 1, wherein the panel supporting member is a resin member adhered to the sheet supporting portion so as to project from the sheet supporting portion.

6. The display device according to claim 1, further comprising a longitudinal member arranged outside and along the outer-edge part of the chassis,
wherein the longitudinal member has a protruding portion that is a part of the longitudinal member protruding inward in plan view and functions the panel supporting member.

7. The display device according to claim 1, wherein:
the light source includes longitudinal linear light sources arranged in parallel;
a light source covering member that covers the end parts of the light sources is arranged along a direction in which the light sources are arranged in parallel and has a sheet supporting portion on the top surface thereof and the panel supporting portion at a higher position than the sheet supporting portion.

8. The display device according to claim 7, wherein the panel supporting portion is formed by raising a part of the top surface of the light source covering member.

9. The display device according to claim 1, wherein the optical sheet includes a diffusing plate arranged on the sheet supporting portion of the chassis and an optical sheet set including a diffusing sheet having a smaller thickness than the diffusing plate, a lens sheet, and a reflection type polarizing sheet arranged on the diffusing plate in any order.

10. The display device according to claim 1, where in the display panel is a liquid crystal panel using liquid crystals.

11. A television receiver apparatus comprising the display device according to claim 1.

* * * * *